(12) United States Patent
Okhravi et al.

(10) Patent No.: US 9,232,439 B2
(45) Date of Patent: Jan. 5, 2016

(54) DYNAMIC LOAD BALANCING BASED ON NETWORK PERFORMANCE

(71) Applicant: Verizon Patent and Licensing Inc., Arlington, VA (US)

(72) Inventors: Reza Okhravi, Walnut Creek, CA (US); Robert Boice, Holliston, MA (US); William H. Stone, Doylestown, PA (US); Stanley A. Zadrozny, Westfield, NJ (US); Derek Hongwei Bao, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 14/056,073

(22) Filed: Oct. 17, 2013

(65) Prior Publication Data
US 2015/0109940 A1    Apr. 23, 2015

(51) Int. Cl.
*H04L 12/26*    (2006.01)
*H04W 28/08*    (2009.01)
*H04W 84/12*    (2009.01)
*H04W 88/06*    (2009.01)

(52) U.S. Cl.
CPC ............ *H04W 28/08* (2013.01); *H04L 43/0888* (2013.01); *H04W 84/12* (2013.01); *H04W 88/06* (2013.01)

(58) Field of Classification Search
CPC ..... H04W 28/08; H04W 28/02; H04W 48/18; H04L 43/0888
USPC .......................................................... 370/328
See application file for complete search history.

(56) References Cited

U.S. PATENT DOCUMENTS

2014/0324371 A1*  10/2014  Huang et al. .................... 702/64

* cited by examiner

*Primary Examiner* — Sai-Ming Chan

(57) ABSTRACT

A server device may be configured to determine a first measure of throughput associated with a cellular wireless network, determine a second measure of throughput associated with a wireless local area network ("WLAN"), compare the first measure of throughput to the second measure of throughput; select, based on the comparing, a particular one of the cellular wireless network or the WLAN, and send an instruction to a user device that is in range of the cellular wireless network and the WLAN, the instruction instructing the user device to connect to the particular selected wireless network.

20 Claims, 12 Drawing Sheets

DYNAMIC LOAD BALANCING BASED ON NETWORK PERFORMANCE

BACKGROUND

Smart phones are becoming increasingly popular, and associated data usage is increasing rapidly. The user experience is the decisive measure of how users of a cellular network perceive the performance of the network and its services. A poor user experience may cause customer dissatisfaction and churn. Wireless network local area networks ("WLANs"), such as "Wi-Fi" networks, may be deployed by cellular operators to offload their cellular networks, and to create a better experience for end users. A user may typically switch to a Wi-Fi network manually, or the user's mobile device may automatically switch to a Wi-Fi network in situations in which the user has previously connected to the Wi-Fi network.

DETAILED DESCRIPTION OF PREFERRED EMBODIMENTS

The following detailed description refers to the accompanying drawings. The same reference numbers in different drawings may identify the same or similar elements.

Wireless network providers, such as cellular wireless network providers, may offer a variety of types of wireless networks, such as cellular wireless networks (e.g., Third Generation ("3G") wireless networks or Fourth Generation ("4G")) and WLANs. For example, a wireless network provider may provide a WLAN by providing Wi-Fi "hot spots" in areas such as stadiums, airports, or other locations, to which users may connect. At times, one type of network (e.g., a cellular network or a WLAN) may become overloaded, thus degrading network performance (e.g., throughput) for some users, while the other type of network (e.g., the other one of the cellular network or the WLAN) may have the capability to provide better performance.

A system and/or method, described herein, may provide for intelligent load balancing, in which user devices may be instructed to connect to different types of wireless networks based on the performance of the wireless networks. Some implementations described herein may provide load balancing techniques in situations where a wireless service provider owns and/or operates a cellular wireless network and a WLAN. Some implementations may provide load balancing techniques in situations where a user device is in range of a cellular network, owned and/or operated by a wireless service provider, and a WLAN owned and/or operated by another entity (e.g., a user's home Wi-Fi network).

Figure 1A:
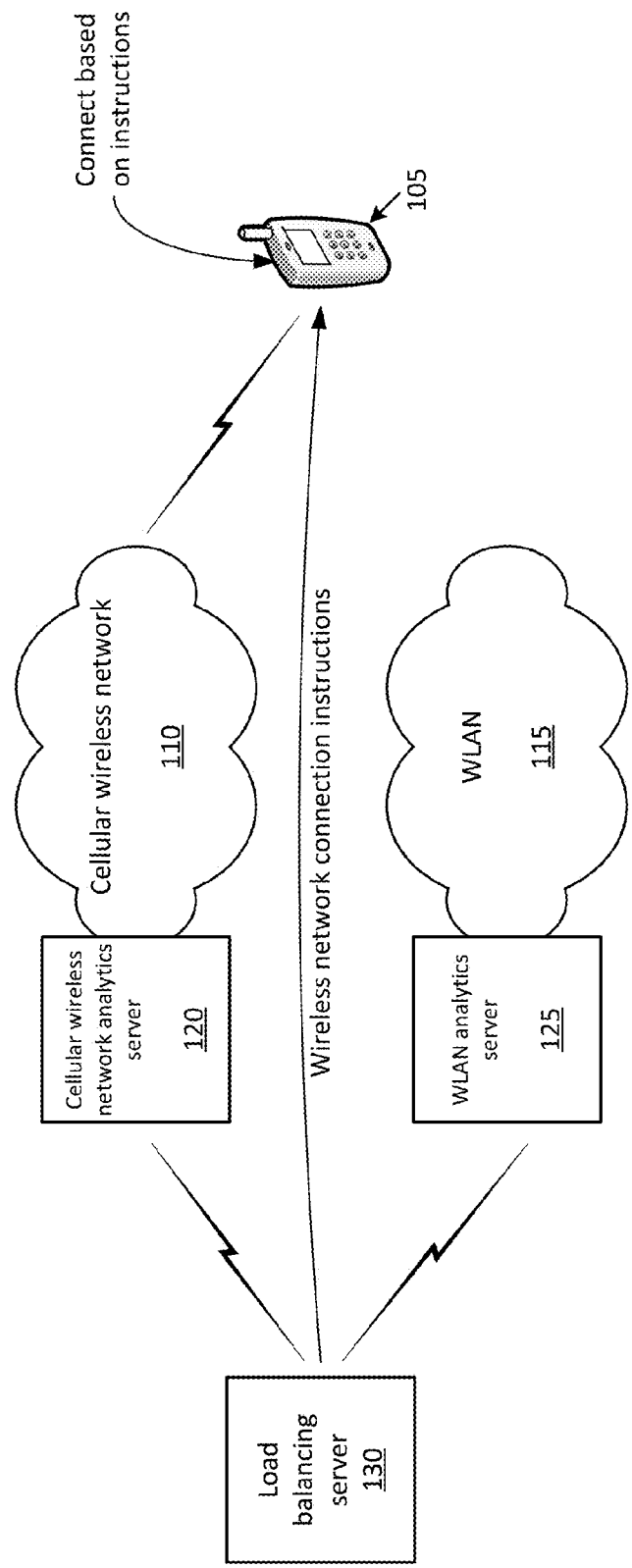
FIGS. 1A, 1B, and 2 illustrate an example overview of one or more implementations described herein.
Figure 1B:
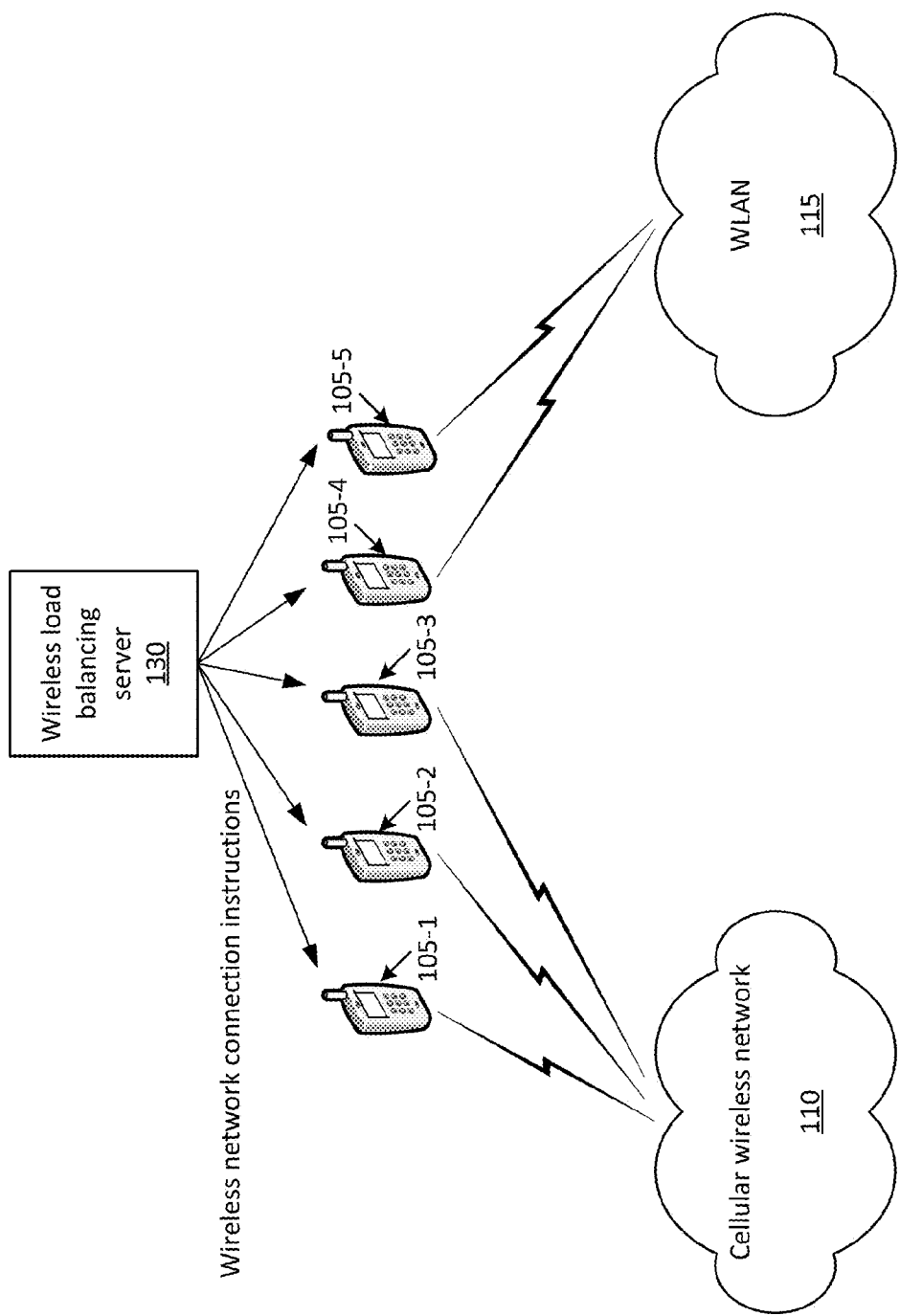

FIGS. 1A and 1B illustrate an example overview of an implementation, in which a user device 105, which is in range of a cellular wireless network 110 and a WLAN 115, may be instructed as to which wireless network to connect. In some implementations, cellular wireless network 110 and WLAN 115 may be owned and/or operated by the same wireless network provider. For instance, cellular wireless network 110 may be associated with a base station, while WLAN 115 may be associated with a "small cell" (e.g., a macrocell, a femtocell, etc.). Cellular wireless network 110 and WLAN 115 may each be associated with a respective analytics server (e.g., cellular wireless analytics server 120 and WLAN analytics server 125), which may monitor performance information associated with each respective network. For instance, cellular wireless analytics server 120 may monitor uplink and/or downlink throughput experienced on a per-user device basis and/or on a network-wide basis by user devices 105 communicating via cellular wireless network 110, and WLAN network analytics server 125 may perform a similar function for WLAN 115.

Load balancing server 130 may receive the analytics information from cellular wireless analytics server 120 and WLAN analytics server 125, and may determine an expected throughput associated with each of networks 110 and 115. Based on the expected throughput, load balancing server 130 may determine to which wireless network user device 105 should connect. For example, if load balancing server 130 determines that the expected throughput provided by cellular wireless network 110 would be sufficient (e.g., above a threshold throughput), load balancing server 130 may send an instruction to user device 105, indicating that user device 105 should connect to cellular wireless network 110 (and/or that user device 105 should not connect to WLAN 115). As another example, if load balancing server 130 determines that the expected throughput provided by cellular wireless network 110 is greater than would be provided by WLAN 115 (or is greater by at least a threshold amount), then load balancing server 130 may send an instruction to user device 105, indicating that user device 105 should connect to cellular wireless network 110. In some implementations, user device 105 may be simultaneously connected to cellular wireless network 110 and to WLAN 115. In some such implementations, load balancing server 130 may instruct user device 105 regarding which network should be used by user device 105 to send and/or receive data.

As shown in FIG. 1B, load balancing server 130 may perform load balancing, by sending different connection instructions to different user devices 105. Load balancing server 130 may, for instance, determine (e.g., based on information provided by cellular wireless analytics server 120 and private wireless analytics server 125, not shown) that user devices 105-1 through 105-5 would experience inadequate throughput (e.g., lower than a threshold throughput) if all of user devices 105-1 through 105-5 connected to cellular wireless network 110. Load balancing server 130 may further determine that if three out of the five user devices 105 connected to cellular wireless network 110 and that if two of the five user devices 105 connected to WLAN 115, that user devices 105-1 through 105-5 would experience acceptable (or improved) throughput. Thus, as shown, load balancing server 130 may instruct user devices 105-1 through 105-3 to connect to cellular wireless network 110, and may instruct user devices 104-5 and 105-5 to connect to WLAN 115. In some implementations, load balancing server 130 may continuously perform the load balancing process described above, in order to dynamically handle changing conditions in networks 110 and 115, and to accommodate new connections from additional user devices 105.

Figure 2:
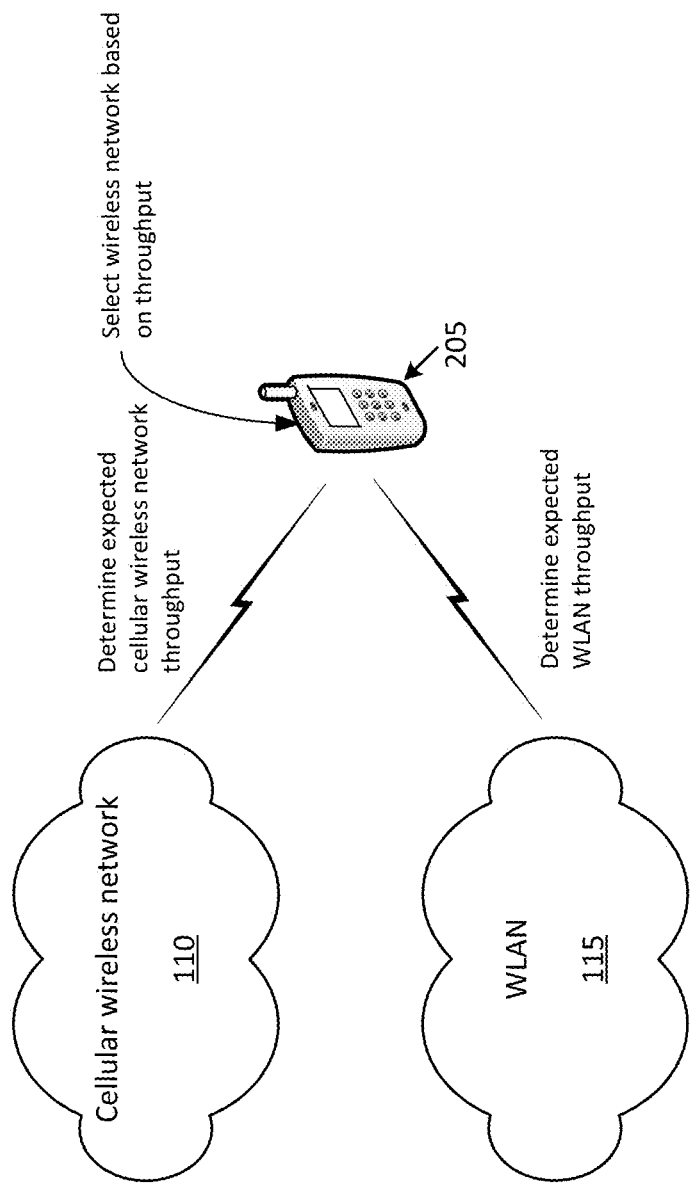

FIG. 2 illustrates an example overview of an implementation in which user device 205, which is in range of cellular wireless network 110 and WLAN 115, may determine to which wireless network to connect. For instance, as shown, user device 205 may determine an expected throughput associated with each of networks 110 and 115. User device 205 may, for example, connect to each network 110 and 115, and may perform a throughput test (e.g., by uploading and/or downloading a known amount of data via networks 110 and/or 115). Additionally, or alternatively, user device 205 may receive information from cellular wireless network 110 and/or WLAN 115 regarding network performance. For example, cellular wireless network 110 may provide information to user device 205, indicating an average throughput that is experienced by user devices connected to cellular wireless network 110. Based on the determined expected throughputs associated with networks 110 and 115, user device 205 may select a particular one of networks 110 and 115, and may connect to the selected wireless network.

Traditionally, for instance, user device 205 may be configured to automatically connect to WLAN 115 (e.g., a user's home Wi-Fi network) when user device 205 is in range of WLAN 115, even if cellular wireless network 110 would provide the same or better performance. Implementations described herein may allow user device 205 to select the better performing wireless network, thereby enhancing the user experience. Further, increased usage of cellular wireless network 110 may enhance the capability of a cellular wireless provider, associated with cellular wireless network 110, to monetize the usage of cellular wireless network 110 (e.g., by charging for the increased data usage on a subscription basis and/or in a metered fashion).

Figure 3A:
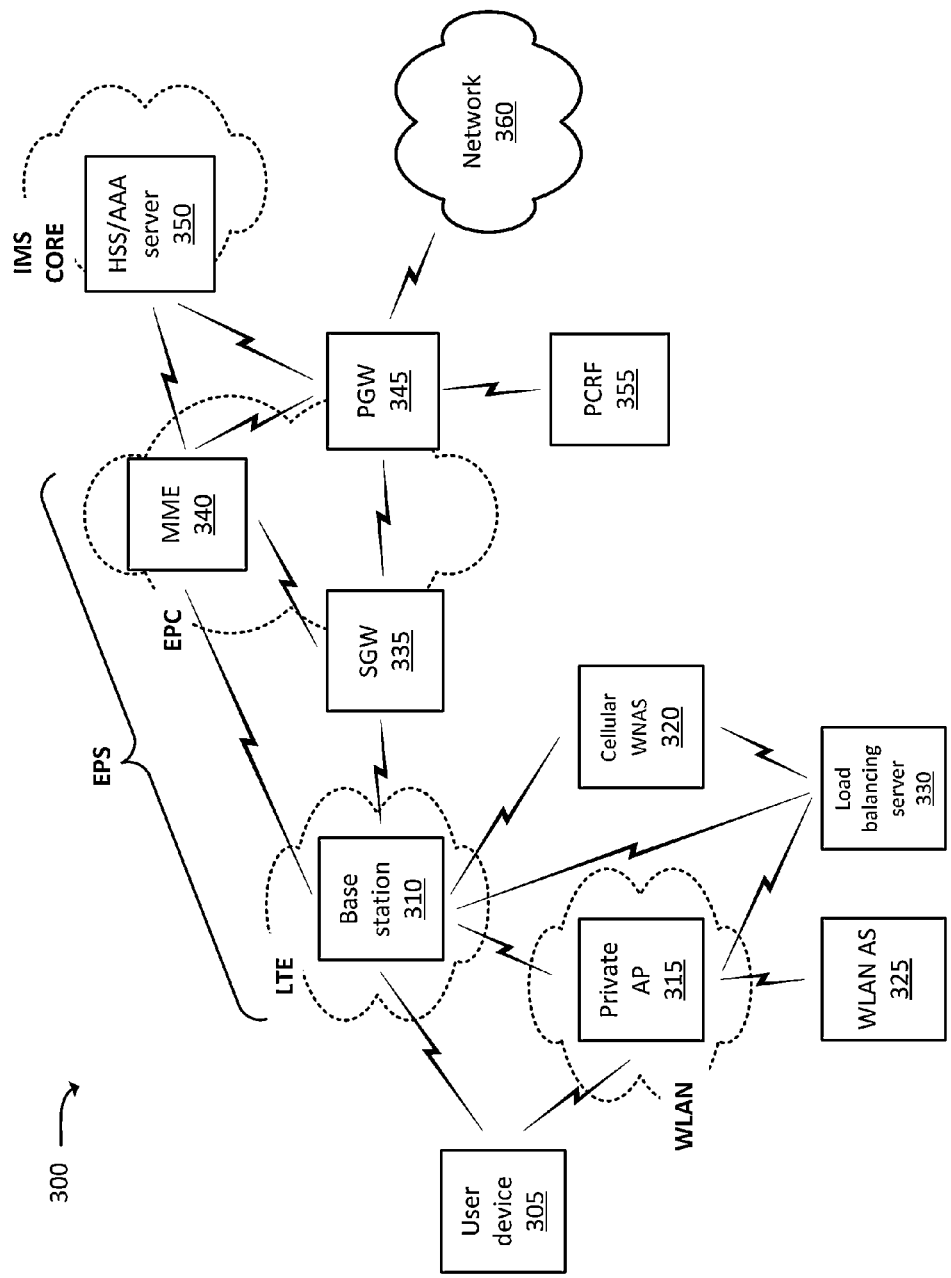
FIGS. 3A-3C illustrate example environments in which systems and/or methods, described herein, may be implemented.

FIG. 3A illustrates example environment 300, in which systems and/or methods described herein may be implemented. As shown in FIG. 3A, environment 300 may include user device 305, base station 310, WLAN access point ("AP") 315, cellular Wireless Network Analytics Server ("WNAS") 320, WLAN Analytics Server ("AS") 325, load balancing server 330, serving gateway ("SGW") 335, mobility management entity device ("MME") 340, packet data network ("PDN") gateway ("PGW") 345, home subscriber server/authentication, authorization, and accounting server (hereinafter referred to as "HSS/AAA server") 350, policy charging and rules function ("PCRF") 355, and network 360.

Environment 300 may include an evolved packet system ("EPS") that includes a Long Term Evolution ("LTE") network and/or an evolved packet core ("EPC") network that operate based on a Third Generation Partnership Project ("3GPP") wireless communication standard. The LTE network may be, or may include, a radio access network ("RAN") that includes one or more base stations 310, some or all of which may take the form of an eNodeB ("eNB"), via which user device 305 may communicate with the EPC network. The EPC network may include one or more SGWs 335, MMEs 340, and/or PGWs 345, and may enable user device 305 to communicate with network 360 and/or an IP multimedia subsystem ("IMS") core network. The IMS core network may include HSS/SPR 350, and may manage authentication, session initiation, account information, a user profile, etc. associated with user device 305. Environment 300 may also include a WLAN, which may operate based on, for example, a Wi-Fi standard (e.g., an IEEE 802.11-based standard), a Bluetooth standard, and/or another type of wireless technique.

User device 305 may include any computation and communication device, such as a wireless mobile communication device that is capable of communicating with one or more networks (e.g., network 360 and/or the IMS core). For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device.

User device 305 may include logic (e.g., hardware and/or software) that may allow user device 305 to communicate wirelessly with networks and/or network devices via different types of wireless technologies, such as via a cellular wireless technology, a Wi-Fi wireless technology, a Bluetooth wireless technology, and/or another type of wireless technology. User device 305 may send traffic to and/or receive traffic from network 360 via base station 310, WLAN AP 315, SGW 335, and/or PGW 345.

Base station 310 may include one or more network devices that receive, process, and/or transmit traffic, such as calls, audio, video, text, and/or other data, destined for and/or received from user device 305. In one example, base station 310 may be an eNB device and may be part of the LTE network. Base station 310 may receive traffic from and/or send traffic to network 360 via SGW 335 and PGW 345. Base station 310 may send traffic to and/or receive traffic from user device 305 via an air interface. The air interface between user device 305 and base station 310 may correspond to a frequency band associated with cellular communications (e.g., a frequency band that has been licensed by a governmental entity, such as a 700 MHz band, a 1900 MHz band, etc.).

WLAN AP 315 may also include one or more network devices that receive, process, and/or transmit traffic. WLAN AP 315 may implement, or be used to implement, a WLAN. In one example, WLAN AP 315 may be used to implement a "small cell" (e.g., a microcell, a femtocell, a picocell, etc.) associated with base station 310. For example, WLAN AP 315 may send traffic to and/or receive traffic from user device 305 via an air interface, and may forward traffic, associated with user device 305, to and/or from base station 310. The air interface between user device 305 and WLAN AP 315 may correspond to a frequency band that is not associated with cellular communication (e.g., an unlicensed frequency band, which has not been licensed by a governmental entity). For instance, the air interface between user device 305 may correspond to a Wi-Fi technology (e.g., IEEE 802.11x), a Bluetooth technology, and/or another wireless communication technology. WLAN AP 315 may communicate, either directly or indirectly, with base station 310 via a wired and/or a wireless connection.

Cellular WNAS 320 may include one or more server devices that gather, process, store, and/or provide information regarding the performance of the LTE network. For example, cellular WNAS 320 may receive analytics information from base station 310 (or, in some implementations, may additionally or alternatively receive information from SGW 335 and/or PGW 345) regarding the throughput of traffic sent to and/or received from user devices 305, via the LTE network. The analytics information may be on a per-user device basis and/or on a network-wide basis. For example, cellular WNAS 320 may receive and store information that indicates an uplink and/or a downlink throughput experienced by a particular user device 305, via base station 310, and/or information that indicates an average uplink and/or a downlink throughput experienced by multiple user devices 305 (e.g., all user devices 305 attached to base station 310).

WLAN AS 325 may include one or more server devices that gather, process, store, and/or provide information regarding the performance of the WLAN. For example, WLAN AS 325 may receive analytics information from WLAN AP 315 regarding the throughput of traffic sent to and/or received from user devices 305, via the WLAN. The analytics information may be on a per-user device basis and/or on a network-wide basis. For example, WLAN AS 325 may receive and store information that indicates an uplink and/or a downlink throughput experienced by a particular user device 305, via WLAN AP 315, and/or information that indicates an average uplink and/or a downlink throughput experienced by multiple user devices 305 (e.g., all user devices 305 attached to WLAN AP 315).

Load balancing server 330 may include one or more server devices that gather, process, store, and/or provide information. For example, as described below, load balancing server 330 may receive network performance information (e.g., from cellular WNAS 320 and/or WLAN AS 325), and instruct user device 305 as to which network to connect. Load balancing server 330 may communicate with user device 305, cellular WNAS 320, and/or WLAN AS 325 directly or indirectly via a wired and/or a wired interface. For example, load balancing server 330 may communicate with user device 305 via base station 310 and/or WLAN AP 315.

SGW 335 may include one or more network devices that gather, process, store, and/or provide information. For example, SGW 335 may include a gateway, a router, a modem, a switch, a firewall, a network interface card ("NIC"), a hub, a bridge, a proxy server, and/or some other type of device that processes and/or transfers traffic. SGW 335 may, for example, aggregate traffic received from one or more base stations 310 and may send the aggregated traffic to network 360 via PGW 345.

MME 340 may include one or more computation and communication devices that gather, process, search, store, and/or provide information. For example, MME 340 may perform operations to register user device 305 with the EPS, to establish bearer channels associated with a session with user device 305, to hand off user device 305 from the EPS to another network, to hand off user device 305 from the other network to the EPS, and/or to perform other operations. MME 340 may perform policing operations on traffic destined for and/or received from user device 305.

PGW 345 may include one or more network devices, or other types of computation and communication devices, that gather, process, search, store, and/or provide information in a manner described herein. For example, PGW 345 may include a gateway, a router, a modem, a switch, a firewall, a NIC, a hub, a bridge, a proxy server, an optical add-drop multiplexer ("OADM"), and/or some other type of device that processes and/or transfers traffic. PGW 345 may aggregate traffic received from one or more SGWs 335, and may send the aggregated traffic to network 360. PGW 345 may also, or alternatively, receive traffic from network 360 and may send the traffic toward user device 305 via SGW 335, and/or base station 310.

HSS/AAA server 350 may include one or more server devices, or other types of devices, that gather, process, search, store, and/or provide information. For example, HSS/AAA server 350 may manage, update, and/or store, in a memory associated with HSS/AAA server 350, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with, for example, user device 305. Additionally, or alternatively, HSS/AAA server 350 may perform authentication, authorization, and/or accounting operations associated with the subscriber and/or a communication session with user device 305.

PCRF 355 may include one or more server devices, or other types of devices, that aggregate information sent to and received from the EPC network and/or other sources. PCRF 355 may receive information regarding policies and/or subscriptions from one or more sources, such as subscriber databases and/or from one or more users (such as, for example, an administrator associated with PCRF 355), and may output policy information to one or more devices that enforce the policies, such as PGW 345.

Network 360 may include one or more wired and/or wireless networks. For example, network 360 may include a wide area network ("WAN"), a metropolitan area network ("MAN"), a telephone network (e.g., the Public Switched Telephone Network ("PSTN")), an ad hoc network, an intranet, a PDN (e.g., the Internet), a fiber optic-based network, and/or a combination of these or other types of networks. In some implementations, network 360 may include a private enterprise network, and/or a private portion of a provider's back-end network.

Figure 3B:
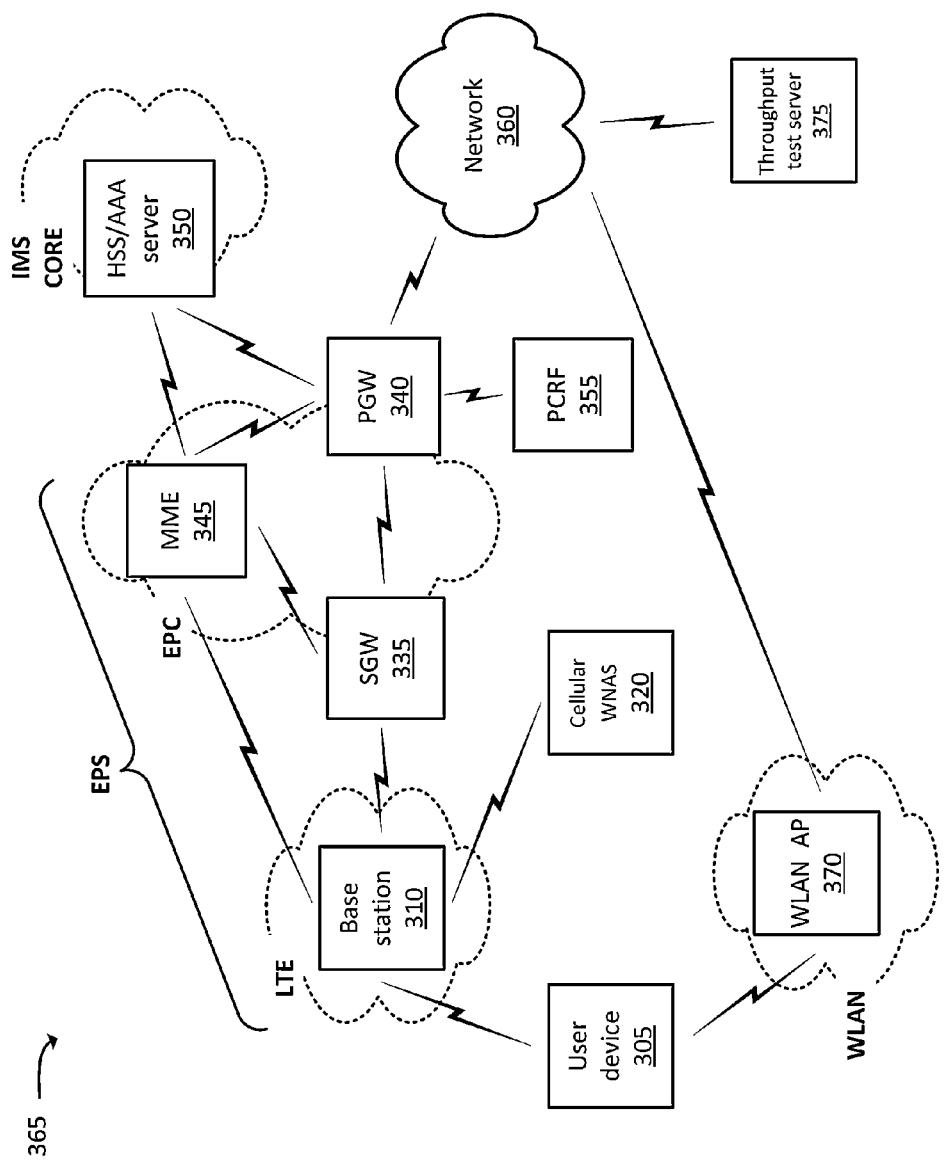

FIG. 3B illustrates another example environment (i.e., environment 365), in which systems and/or methods described herein may be implemented. As shown in FIG. 3B, environment 365 may include user device 305, base station 310, cellular WNAS 320, SGW 335, MME 340, PGW 345, HSS/AAA server 350, PCRF 355, network 360, WLAN AP 370, and throughput test server 375.

WLAN AP 370 may include one or more network devices that receive, process, and/or transmit traffic. WLAN AP 370 may implement, or be used to implement, a WLAN. For example, WLAN AP 370 may send traffic to and/or receive traffic from user device 305 via an air interface, and may forward traffic, received from and/or sent to user device 305, to and/or from network 360. The air interface between user device 305 and WLAN AP 370 may correspond to a frequency band that is not associated with cellular communication (e.g., an unlicensed frequency band, which has not been licensed by a governmental entity).

Throughput test server 375 may include one or more server devices that receive, process, and/or provide information. For example, throughput test server 375 may send and/or receive traffic to and/or from user device 305 (e.g., via WLAN AP 370 and network 360), and may determine (or may aid in the determination of) an uplink and/or a downlink throughput experienced by user device 305.

In the example shown in FIG. 3B, cellular WNAS 320 may perform similar functions to those described above with respect to FIG. 3A. In some implementations, cellular WNAS 320 may additionally, or alternatively, provide information regarding the performance of the LTE network (e.g., average throughput experienced by user devices 305 via base station 310) to user device 305.

Further, in the example shown in FIG. 3B, user device 305 may perform similar functions to those described above with respect to FIG. 3A. User device 305 may additionally receive network performance information (e.g., average throughput information) from cellular WNAS 320 and/or throughput test server 375, and may determine whether to connect to base station 310 or WLAN AP 370 based on the received network performance information.

Figure 3C:
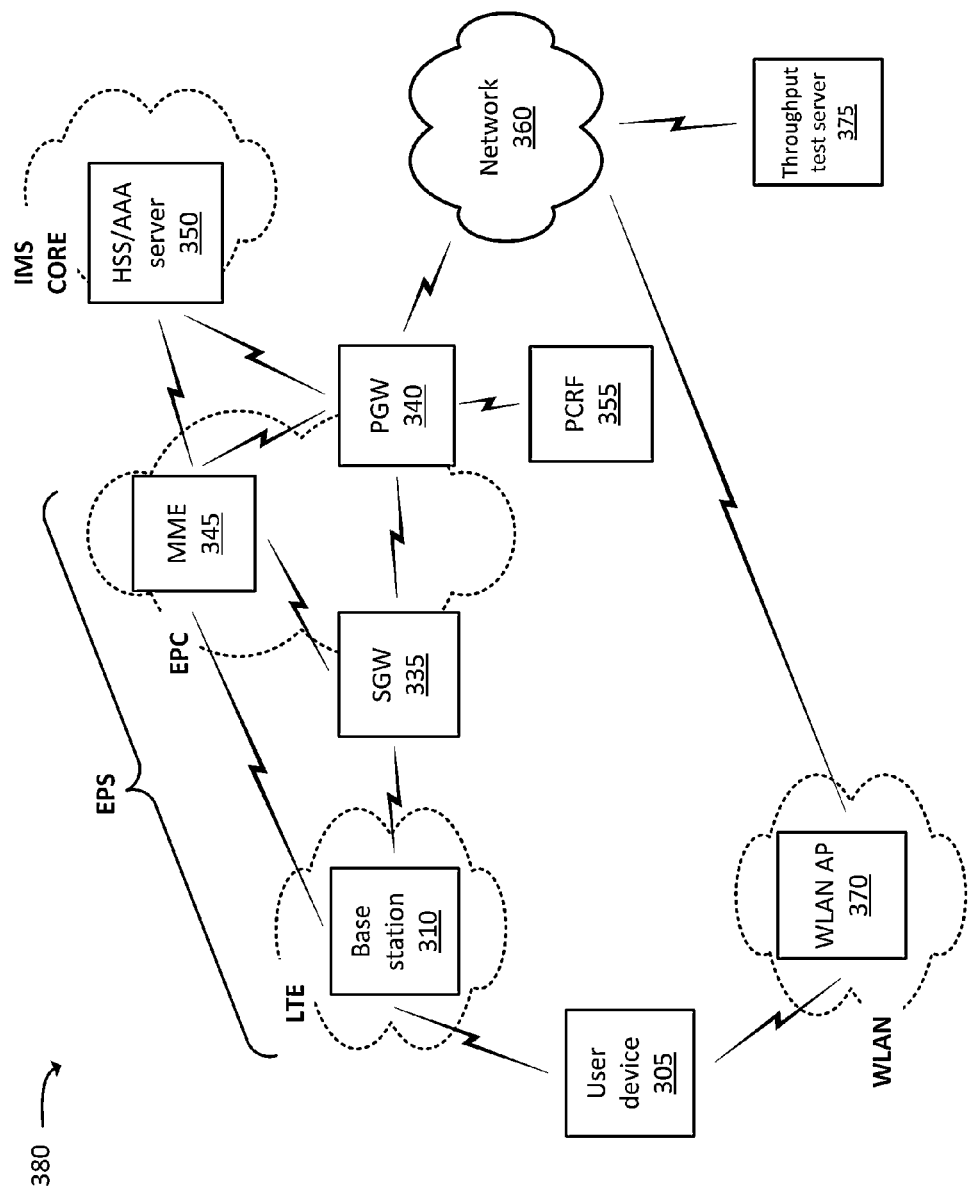

FIG. 3C illustrates another example environment (i.e., environment 380), in which systems and/or methods described herein may be implemented. As shown in FIG. 3C, environment 380 may include user device 305, base station 310, SGW 335, MME 340, PGW 345, HSS/AAA server 350, PCRF 355, network 360, WLAN AP 370, and throughput test server 375.

In the example shown in FIG. 3C, throughput test server 375 may perform similar functions to those described above with respect to FIG. 3B. Throughput test server 375 may additionally be used to determine performance information for the LTE network and/or the EPC network. For example, throughput test server 375 may send and/or receive traffic to and/or from user device 305, via base station 310, and may determine (or aid in determining) a throughput experienced by user device 305 via base station 310.

Further, in the example shown in FIG. 3C, user device 305 may perform similar functions to those described above with respect to FIGS. 3A and/or 3B. User device 305 may additionally, or alternatively, receive throughput information from throughput test server 375, and may determine whether to connect to base station 310 or WLAN AP 370 based on the received throughput information.

The quantities of devices and/or networks, illustrated in FIGS. 3A-3C, are provided for explanatory purposes only. In practice, there may be additional devices and/or networks; fewer devices and/or networks; different devices and/or networks; or differently arranged devices and/or networks than illustrated in FIGS. 3A-3C. Alternatively, or additionally, one or more of the devices of environments 300, 365, and/or 385 may perform one or more functions described as being performed by another one or more of the devices of environments 300, 365, and/or 380. Devices of environments 300, 365, and/or 380 may interconnect via wired connections, wireless connections, or a combination of wired and wireless connections.

Figure 4:
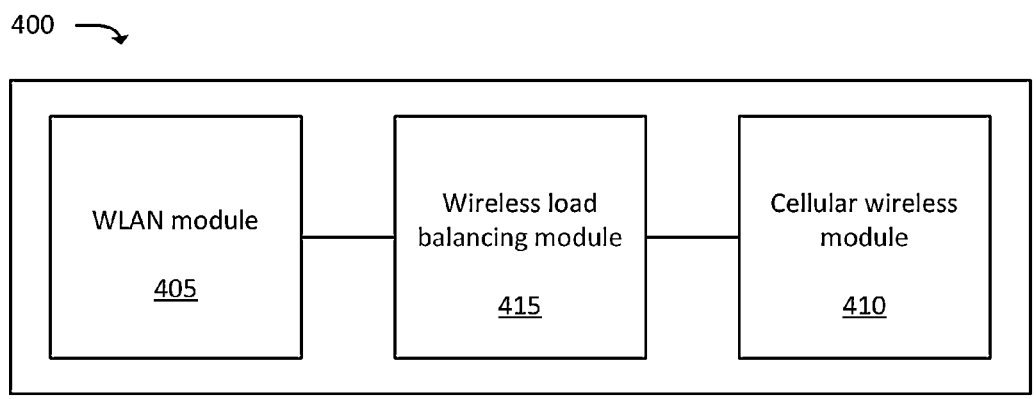
FIG. 4 illustrates example components of a user device, in accordance with some implementations described herein.

FIG. 4 illustrates functional components of example user device 400. User device 400 may correspond to, for example, user device 305 in some implementations. User device 400 may include WLAN module 405, cellular wireless module 410, and wireless load balancing module 415. WLAN module 405, cellular wireless module 410, and wireless load balancing module 415 may each include hardware and/or software to perform the functionality described herein.

For example, WLAN module 405 may allow user device 400 to connect to a WLAN. For example, WLAN module 405 may include a radio transceiver that is capable of wirelessly communicating with, for example, WLAN AP 315. WLAN module 405 may communicate according to Wi-Fi, Bluetooth, and/or another wireless technology.

Cellular wireless module 410 may allow user device 400 to connect to a cellular wireless network. For example, cellular wireless module 410 may include a radio transceiver that is capable of wirelessly communicating with, for example, base station 310. Cellular wireless module 410 may communicate according to a cellular wireless technology (e.g., 3G, 4G, etc.).

Wireless load balancing module 415 may determine whether user device 400 should connect to a WLAN or to a cellular wireless network, and may cause user device 400 to use WLAN module 405 or cellular wireless module 410 to connect to the selected type of network. As used herein, the phrase "connect to" may, in some implementations, refer to the use of a network at the application layer of the Open Systems Interconnection ("OSI") model. For example, in some such implementations, user device 400 may be simultaneously "connected," at the network layer, to a cellular wireless network and a WLAN. However, wireless load balancing module 415 may instruct to user device 400 to send or receive data via only one of the two networks, and/or may cause an application layer of user device 400 not to be aware of the network layer connection to one of the two networks. In this sense, wireless load balancing module 415 may instruct user device 400 to "connect to" (e.g., at the application layer) a particular type of network. In some implementations, wireless load balancing module 415 may instruct user device 400 to connect to, forgo connecting to, or disconnect from, a particular type of network at a layer that is lower than the application layer (e.g., the network layer, the data link layer, and/or the physical layer).

In some implementations, the operation of wireless load balancing module 415 may apply to certain types of traffic sent or received by user device 400, without applying to all traffic sent or received by user device 400. For example, in some implementations, notwithstanding the operation of wireless load balancing module 415, user device 400 may maintain a physical connection with a cellular wireless network, and may send or receive voice call traffic via the cellular wireless network. Assume, for instance, that wireless load balancing module 415 causes user device 400 to connect to the WLAN. In some such implementations, user device 400 may continue to send or receive voice call traffic via the cellular wireless network, while sending or receiving other types of traffic (e.g., video calls, data transfer, web browsing, etc.) via the WLAN.

In some implementations, wireless load balancing module 415 may receive information regarding the performance of the cellular wireless network and the WLAN from cellular WNAS 320 and/or throughput test server 375. Wireless load balancing module 415 may, in some implementations, determine the performance of the cellular wireless network by requesting information regarding the average throughput experienced by user devices 305 over a particular period of time when connected to base station 310. In some implementations, wireless load balancing module 415 may determine the throughput of the cellular wireless network by communicating with throughput test server 375 in order to perform a throughput test (sometimes referred to as a "speed test"), in which user device 305 may upload and/or download a particular amount of traffic to and/or from throughput test server 375 via base station 310, and the throughput may be determined based on how much time the uploading and/or downloading take. Similarly, in some implementations, wireless load balancing module 415 may perform a speed test with the aid of throughput test server 375 in order to determine the performance of the WLAN (e.g., the throughput experienced by user device 305 when connected to WLAN AP 370).

As described below, wireless load balancing module 415 may perform a comparison of the performances of the networks to each other and/or to one or more thresholds, in order to determine to which network user device 305 should connect. In some implementations, for instance, when determining that user device 305 should connect to the cellular wireless network, wireless load balancing module 415 may disable WLAN module 405, and/or may otherwise cause user device 305 to not connect to, or send or receive traffic via, the WLAN. Similarly, when determining that user device 305 should connect to the WLAN, wireless load balancing module 415 may disable cellular wireless module 410, and/or may otherwise cause user device 305 to not connect to, or send or receive traffic via, the cellular wireless network.

In some implementations, wireless load balancing module 415 may output a notification or a prompt regarding determinations made by wireless load balancing module 415. For instance, consider a situation where a user has configured user device 305 to connect to the user's home Wi-Fi network. Assume that user device 305 is in range of the Wi-Fi network, and is also in range of a cellular wireless network, and that wireless load balancing module 415 determines that the cellular wireless network should be connected to (e.g., the throughput or expected throughput of the cellular wireless network is greater than the throughput of the home Wi-Fi network). Wireless load balancing module 415 may cause a notification to be presented (e.g., visually and/or audibly) via user device 305, which alerts the user that wireless load balancing module 415 has caused user device 305 to connect to the cellular wireless network, even though the home Wi-Fi network is available. Additionally, or alternatively in some implementations, wireless load balancing module 415 may cause a prompt to be presented, requesting the user's permission before causing user device 305 to connect to the cellular wireless network (e.g., disconnecting from the home Wi-Fi network).

Figure 5:
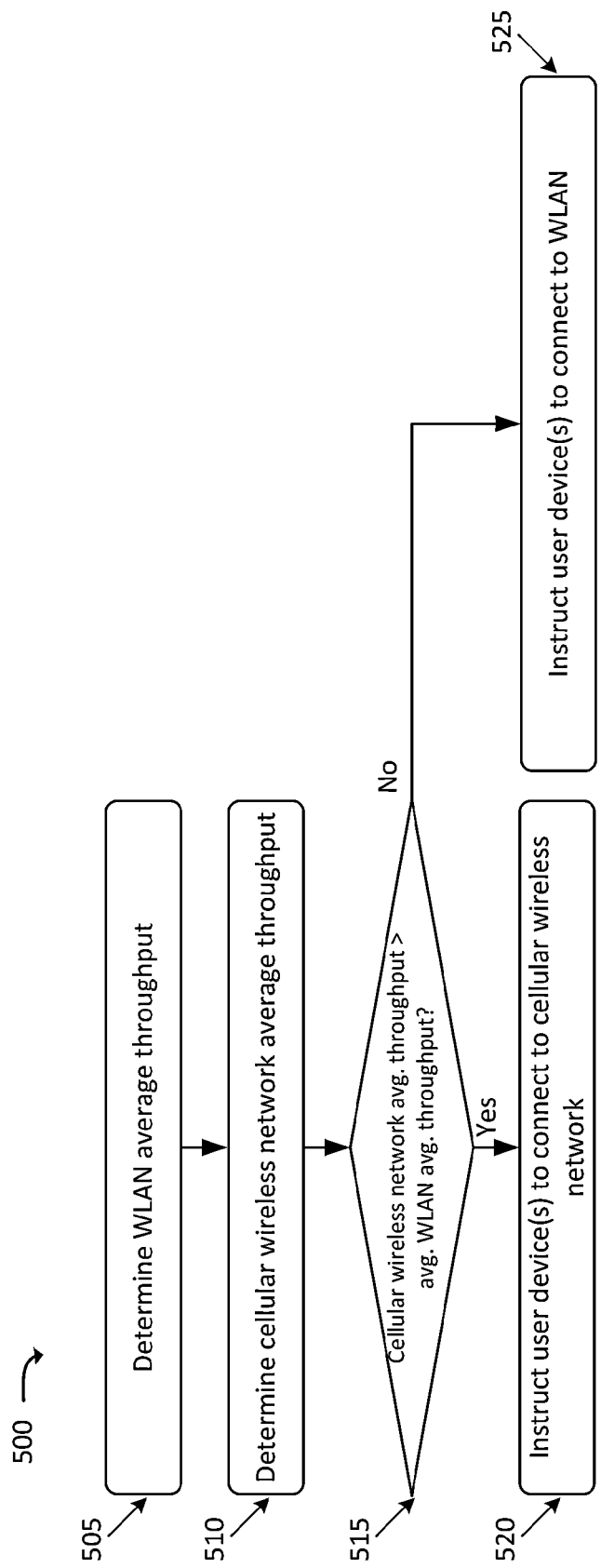
FIGS. 5-7 illustrate example processes for selecting a wireless network based on network performance, and instructing user devices to connect to the selected wireless network.
Figure 6:
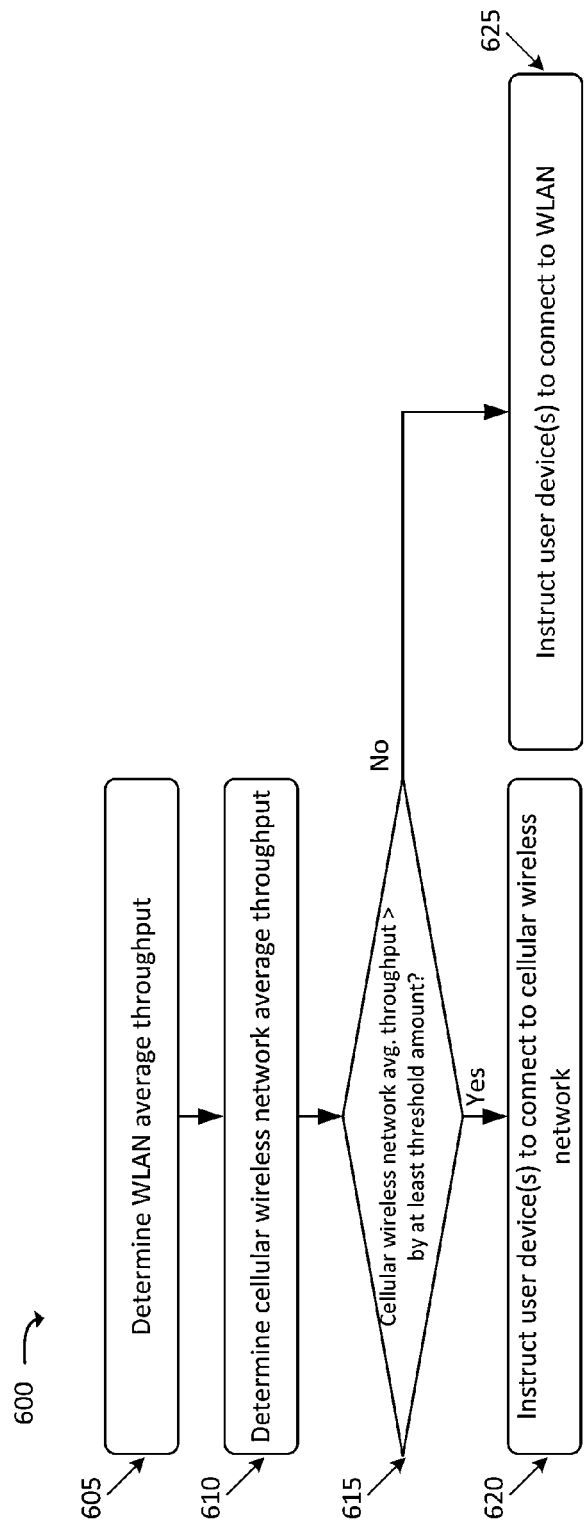
Figure 7:
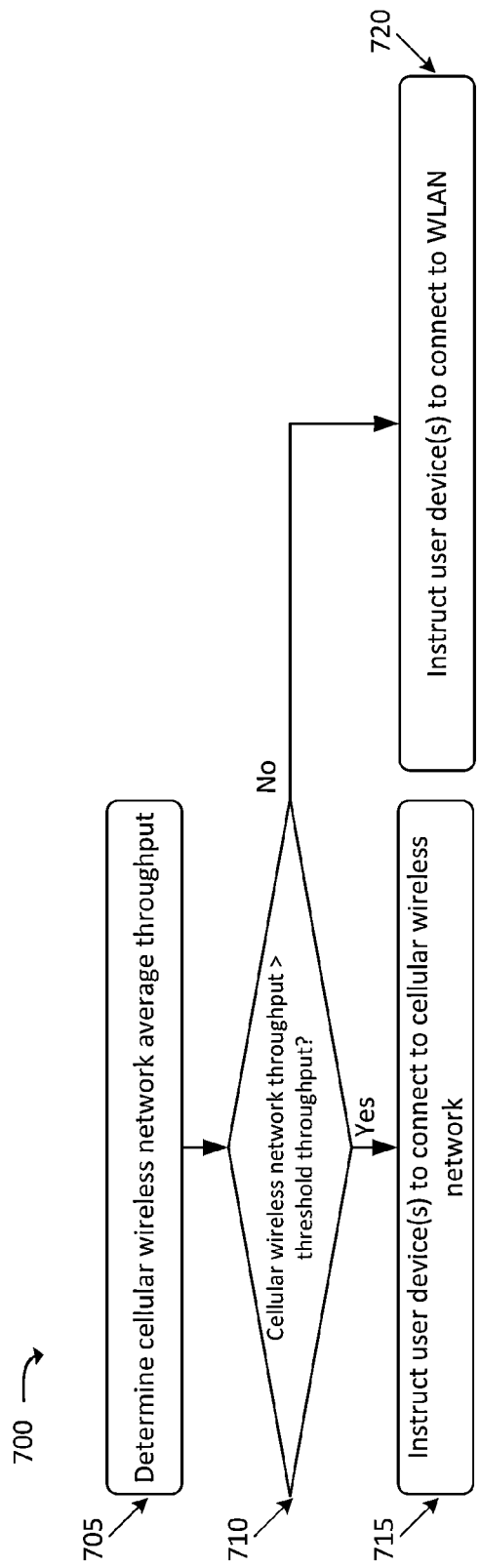

FIGS. 5-7 illustrate example processes 500, 600, and 700 (referred to herein as "processes 500-700") for selecting a wireless network based on network performance, and instructing user devices to connect to the selected wireless network. In one example implementation, processes 500-700 may be performed by load balancing server 330. In other implementations, one or more of processes 500-700 may be performed by one or more devices in addition to, or in lieu of, load balancing server 330.

In some implementations, processes 500-700 may be performed upon initial attachment of a particular user device 305 to a cellular wireless network and/or to a WLAN. In some implementations, processes 500-700 may be performed on an ongoing basis, in order to continuously ensure that user devices 305 are connected to the cellular wireless network or the WLAN in a manner that achieves desired performance goals.

As shown in FIG. 5, process 500 may include determining the average throughput of a WLAN (block 505). For example, load balancing server 330 may receive (e.g., in response to a request made by load balancing server 330, or pushed to load balancing server 330) throughput information, regarding the WLAN, from WLAN AS 325. The received information may indicate a measure of throughput, such as an average throughput experienced by user devices 305 that are attached to the WLAN (e.g., throughput of traffic sent to and/or from user devices 305 via WLAN AP 315). The received information may correspond to a particular period of time (e.g., the preceding hour, the preceding six hours, the preceding day, or another period of time).

Process 500 may also include determining the average throughput of a cellular wireless network (block 510). For example, load balancing server 330 may receive (e.g., in response to a request made by load balancing server 330, or pushed to load balancing server 330) throughput information, regarding the cellular wireless network, from cellular WNAS 320. The received information may indicate a measure of throughput, such as an average throughput experienced by user devices 305 that are attached to the cellular wireless network (e.g., throughput of traffic sent to and/or from user devices 305 via base station 310), and may correspond to a particular period of time (e.g., the preceding hour, the preceding six hours, the preceding day, or another period of time). In some implementations, the period of time to which the information regarding the cellular wireless network corresponds, may be the same period of time to which the information regarding the WLAN corresponds.

Process 500 may further include determining whether the average cellular wireless network throughput is greater than the average WLAN throughput (block 515). If the average throughput of the cellular wireless network is greater than the average throughput of the WLAN (block 515—YES), then process 500 may include instructing a user device to connect to the cellular wireless network (block 520). For example, load balancing server 330 may send an instruction to user device 305, which may cause user device 305 to connect to the cellular wireless network, or to remain connected to the cellular wireless network.

In some implementations, the instruction (sent at block 520) may cause user device 305 to forgo connecting to the WLAN. For example, the instruction may cause user device 305 to disable, or to otherwise not utilize, logic and/or a wireless transceiver that is capable of connecting to the WLAN. Additionally, or alternatively, the instruction may cause user device 305 to enable, or to otherwise utilize, logic and/or a wireless transceiver that is capable of connecting to the cellular wireless network. For example, the instruction may cause user device 305 to switch from being connected to the WLAN to the cellular wireless network, in situations where user device 305 is presently connected to the WLAN.

If, on the other hand, the average throughput of the cellular wireless network is not greater than the average throughput of the WLAN (block 515—NO), then process 500 may include instructing the user device to connect to the WLAN (block 525). For example, load balancing server 330 may send an instruction to user device 305, which may cause user device 305 to connect to the WLAN, or to remain connected to the WLAN.

In some implementations, the instruction (sent at block 525) may cause user device 305 to forgo connecting to the cellular wireless network. For example, the instruction may cause user device 305 to disable, or to otherwise not utilize, logic and/or a wireless transceiver that is capable of connecting to the cellular wireless network. Additionally, or alternatively, the instruction may cause user device 305 to enable, or to otherwise utilize, logic and/or a wireless transceiver that is capable of connecting to the WLAN. For example, the instruction may cause user device 305 to switch from being connected to the cellular wireless network to the WLAN, in situations where user device 305 is presently connected to the cellular wireless network.

As mentioned above, process 500 may be performed upon initial attachment of user device 305 to a network, and/or on an ongoing basis. In this manner, different user devices 305 may receive instructions to connect to different wireless networks (e.g., as shown in FIG. 1B). That is, the determination made at block 515 may yield different results, based on ever-changing conditions of the cellular wireless network and/or the WLAN (e.g., network congestion, the amount of traffic being sent via the network, the quantity of user devices 305 attached to the network, etc.). For instance, while the cellular wireless network may provide better performance than the WLAN at one particular time (e.g., block 515—YES), the cellular wireless network may provide worse performance than the WLAN at another time (e.g., block 515—NO).

Referring to FIG. 6, some blocks of process 600 may be similar to some blocks of process 500, illustrated in FIG. 5. For example, blocks 605, 610, 620, and 625 may be similar to blocks 505, 510, 520, and 525, respectively. Thus, since similar blocks are described above, these blocks of FIG. 6 are not described in detail here, for the sake of conciseness.

Process 600 may include determining (at block 615) whether the average cellular wireless network throughput (determined at block 610) is greater than the average WLAN throughput determined (at block 605) by at least a threshold amount. For example, load balancing server 330 may be configured (e.g., by an administrator of the cellular wireless network and/or of the WLAN, and/or by a user of user device 305) to allow user device 305 to remain on the WLAN unless the cellular wireless network provides substantially (e.g., at least the threshold amount) better performance.

For instance, assume that the threshold amount is 1.0 megabyte per second ("MB/s"), that the cellular wireless network average throughput is 2.0 MB/s, and that the WLAN average throughput is 1.5 MB/s. Since the cellular wireless network average throughput (2.0 MB/s) is not at least 1.0 MB/s greater than the WLAN average throughput (1.5 MB/s), the determination at block 615 in this situation may be "NO."

As another example, assume that the threshold amount is 1.0 megabyte per second ("MB/s"), that the cellular wireless network average throughput is 2.0 MB/s, and that the WLAN average throughput is 0.5 MB/s. Since the cellular wireless network average throughput (2.0 MB/s) is at least 1.0 MB/s greater than the WLAN average throughput (0.5 MB/s), the determination at block 615 in this situation may be "YES."

Based on the determination (made at block 615), load balancing server 330 may send an instruction (at block 620 or block 625) to user device 305. This instruction may cause user device 305 to connect to a selected network in a manner similar to that described above with respect to FIG. 5.

Referring to FIG. 7, some blocks of process 700 may be similar to some blocks of process 500, illustrated in FIG. 5. For example, blocks 705, 715, and 720 may be similar to blocks 510, 520, and 525, respectively. Thus, since similar blocks are described above, these blocks of FIG. 7 are not described in detail here, for the sake of conciseness.

Process 700 may include determining (at block 710) whether the cellular wireless network average throughput (determined at block 705) is greater than a threshold throughput. For example, load balancing server 330 may be configured (e.g., by an administrator of the cellular wireless network and/or by a user of user device 305) to allow user device 305 to connect to, or remain on, a WLAN unless the cellular wireless network provides at least an acceptable throughput (e.g., the threshold throughput).

For instance, assume that the threshold throughput is 5.0 MB/s, and that the cellular wireless network average throughput is 5.5 MB/s. Since the cellular wireless network average throughput (5.5 MB/s) is greater than the threshold throughput (5.0 MB/s), the determination at block 615 in this situation may be "YES."

As another example, assume that the threshold throughput is 5.0 MB/s, and that the cellular wireless network average throughput is 4.5 MB/s. Since the cellular wireless network average throughput (4.5 MB/s) is not greater than the threshold throughput (5.0 MB/s), the determination at block 615 in this situation may be "NO."

Based on the determination (made at block 715), load balancing server 330 may send an instruction (at block 715 or block 720) to user device 305. This instruction may cause user device 305 to connect to a selected network in a manner similar to that described above with respect to FIG. 5.

Figure 8:
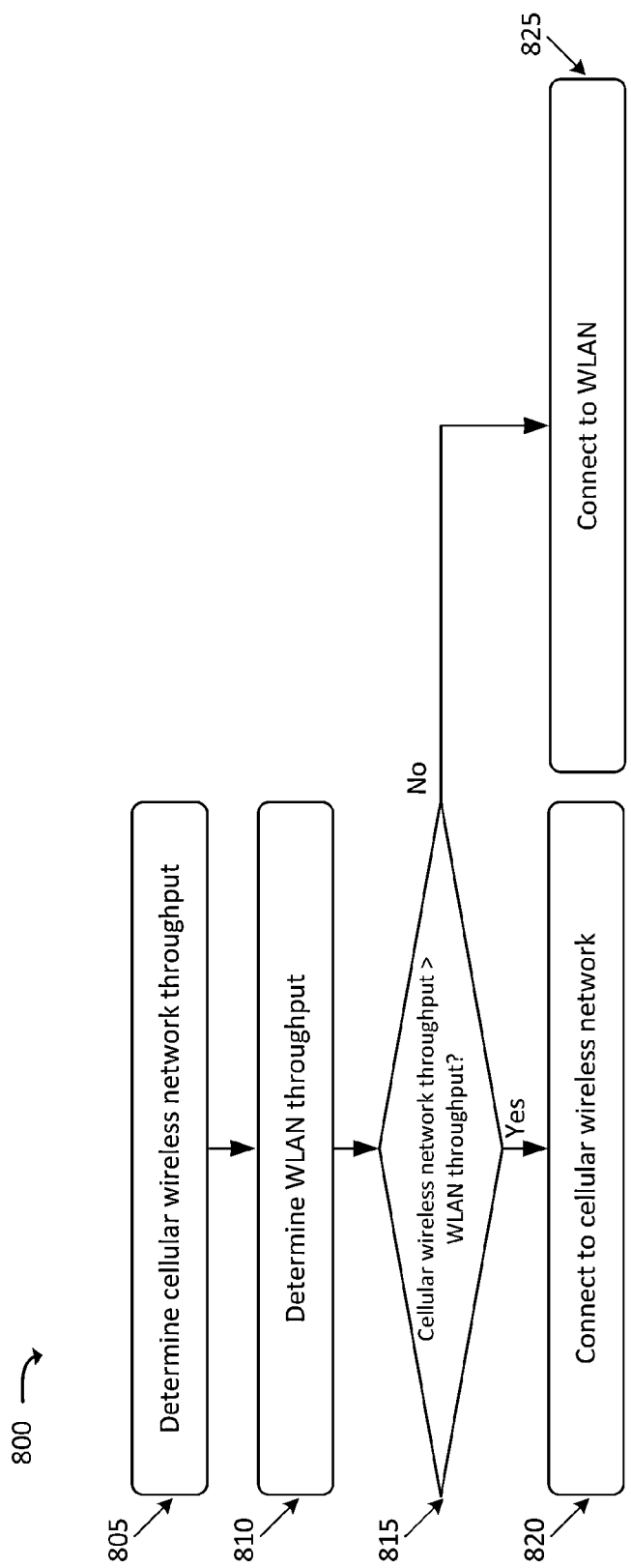
FIG. 8 illustrates an example process for selecting a wireless network based on network throughput, and connecting to the selected wireless network.

FIG. 8 illustrates an example process 800 for selecting a wireless network based on network throughput, and connecting to the selected wireless network. In one example implementation, process 800 may be performed by user device 305. In other implementations, some or all of process 800 may be performed by one or more other devices in addition to, or in lieu of, user device 305.

Some or all of process 800 may be performed upon, or before, attachment of user device 305 to a WLAN. In some implementations, some or all of process 800 may be performed on a periodic or continuous basis, in order to account for potentially changing network conditions.

Process 800 may include determining a throughput of a cellular wireless network (block 805). For example, as described above with respect to wireless load balancing module 415, user device 305 may receive average throughput information, pertaining to the cellular wireless network, from cellular WNAS 320. Additionally, or alternatively, user device 305 may perform a speed test (e.g., by communicating with throughput test server 375 via base station 310), in order to determine the throughput of the cellular wireless network.

Process 800 may also include determining a throughput of a WLAN (block 810). For example, as described above with respect to wireless load balancing module 415, user device 305 may perform a speed test (e.g., by communicating with throughput test server 375 via WLAN AP 315), in order to determine the throughput of the WLAN. In order to determine the throughput of the WLAN, wireless load balancing module 415 may cause WLAN module 405, of user device 305, to become active (e.g., to power on, become enabled, etc.) in order to connect to WLAN AP 315, prior to performing the speed test.

Process 800 may further include determining (at block 815) whether the throughput of the cellular wireless network (determined at block 805) is greater than the throughput of the WLAN (determined at block 810). If the throughput of the cellular wireless network is greater (block 815—YES), then process 800 may include connecting to the cellular wireless network. For example, as described above with respect to wireless load balancing module 415, user device 305 may connect to, or remain connected to, the cellular wireless network. user device 305 may, in some situations, enable cellular wireless module 410 in order to connect to the cellular wireless network, and/or may disable WLAN module 405 when connecting to the cellular wireless network.

If, on the other hand, the throughput of the cellular wireless network is not greater (block 815—NO), then process 800 may include connecting to the WLAN. For example, as described above with respect to wireless load balancing module 415, user device 305 may connect to, or remain connected to, the WLAN. user device 305 may, in some situations, enable WLAN module 405 in order to connect to the WLAN, and/or may disable WLAN module 405 when connecting to the WLAN.

While an example determination was described above with respect to block 815, in some implementations, user device 305 may use additional, or alternative, criteria when determining whether to connect to the cellular wireless network or the WLAN. For instance, in some implementations, block 815 may include determining whether the throughput provided by the cellular wireless network provides at least a threshold amount greater than the throughput provided by the WLAN.

In some implementations, block 815 may include determining whether the throughput provided by the WLAN is at least a threshold amount greater than the throughput provided by the cellular wireless network. In some such implementations, user device 305 may connect to the WLAN upon a positive determination, and may otherwise connect to the cellular wireless network.

Figure 9:
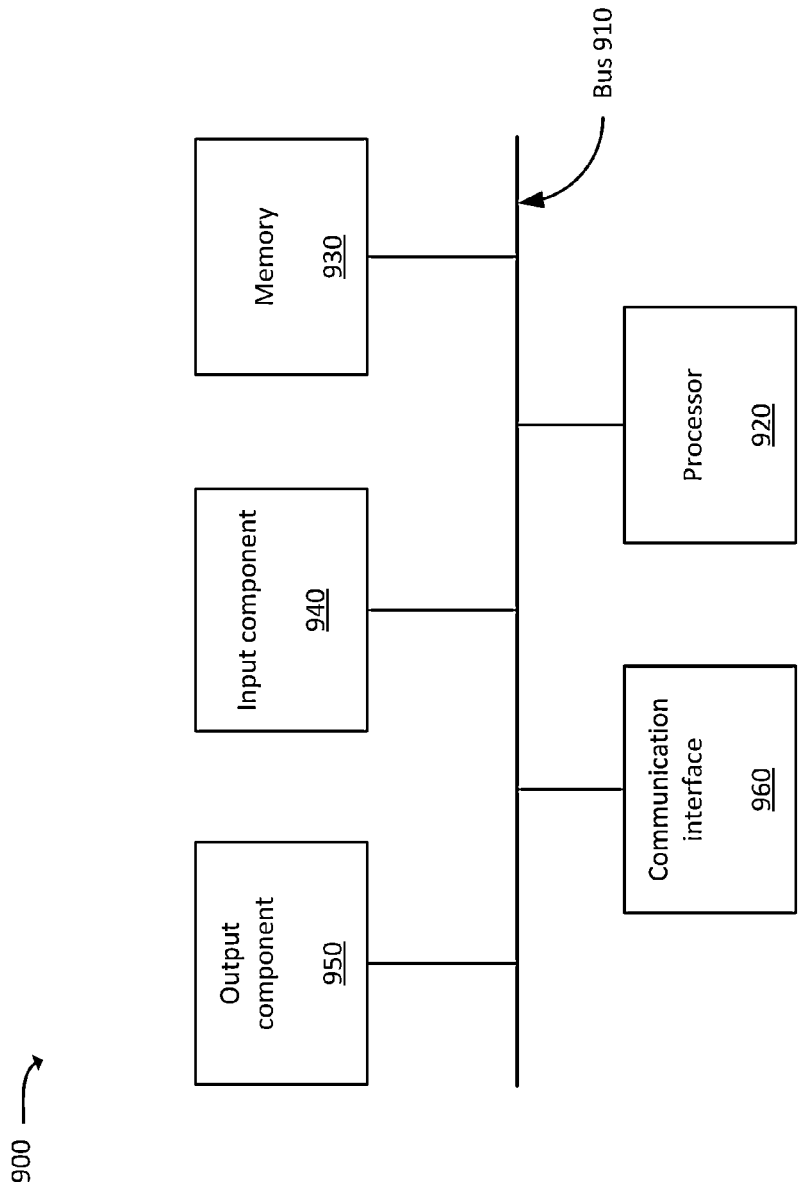
FIG. 9 illustrates example components of one or more devices, according to one or more implementations described herein.

FIG. 9 is a diagram of example components of device 900. One or more of the devices described above (e.g., with respect to FIGS. 1A, 1B, 2, 3A-3C, and 4) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5-8, the order of the blocks may be modified in other implementations. Further, non-dependent blocks may be performed in parallel. Also, additional blocks may be present, either before, after, or in between the blocks shown in these figures.

Furthermore, the term "average" is used above to describe some example implementations. In some implementations, in addition to, or in lieu of average throughput experienced by user devices, other measures of throughput may be used, such as median, minimum, maximum, first quartile, third quartile, etc.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    determining, by a server device, a first measure of throughput associated with a cellular wireless network;
    determining, by the server device, a second measure of throughput associated with a wireless local area network ("WLAN");
    comparing, by the server device, the first measure of throughput to the second measure of throughput;
    selecting, by the server device and based on the comparing, a particular one of the cellular wireless network and the WLAN; and
    sending, by the server device, an instruction to a user device that is in range of the cellular wireless network and the WLAN, the instruction instructing the user device to connect to the particular selected wireless network.

2. The method of claim 1, wherein the first measure of throughput is an average throughput of traffic sent to or received by a set of user devices, via the cellular wireless network.

3. The method of claim 2, wherein the first measure of throughput is associated with a particular period of time, wherein the second measure of throughput is an average throughput of traffic sent to or received by a plurality of user devices, via the WLAN over the same particular period of time.

4. The method of claim 1, wherein the cellular wireless network operates at a set of frequency bands that have been licensed from a governmental entity.

5. The method of claim 4, wherein the WLAN operates at a set of frequency bands that have not been licensed from a governmental entity.

6. The method of claim 1, wherein selecting the particular one of the cellular wireless network and the WLAN, based on the comparing, includes:
 determining whether the first measure of throughput is greater than the second measure of throughput;
 selecting, when determining that the first measure of throughput is greater than the second measure of throughput, the cellular wireless network; and
 selecting, when determining that the first measure of throughput is not greater than the second measure of throughput, the WLAN.

7. The method of claim 1, wherein selecting the particular one of the cellular wireless network and the WLAN, based on the comparing, includes:
 determining whether the first measure of throughput is greater than the second measure of throughput by at least a threshold amount;
 selecting, when determining that the first measure of throughput is greater than the second measure of throughput by at least the threshold amount, the cellular wireless network; and
 selecting, when determining that the first measure of throughput is not greater than the second measure of throughput by at least the threshold amount, the WLAN.

8. The method of claim 1, wherein the cellular wireless network is the selected particular one of the cellular wireless network and the WLAN,
 wherein the instruction further instructs the user device to disable wireless circuitry, of the user device, that allows the user device to connect to the WLAN.

9. A server device, comprising:
 one or more memory devices storing a set of processor-executable instructions; and
 one or more processors configured to execute the set of processor-executable instructions, wherein executing the set of processor-executable instructions causes the one or more processors to:
  determine a first measure of throughput associated with a cellular wireless network,
  determine a second measure of throughput associated with a wireless local area network ("WLAN"),
  compare the first measure of throughput to the second measure of throughput;
  select, based on the comparing, a particular one of the cellular wireless network and the WLAN, and
  send an instruction to a user device that is in range of the cellular wireless network and the WLAN, the instruction instructing the user device to connect to the particular selected wireless network.

10. The server device of claim 9, wherein the first measure of throughput is an average throughput of traffic sent to or received by a set of user devices, via the cellular wireless network.

11. The server device of claim 10, wherein the first measure of throughput is associated with a particular period of time, wherein the second measure of throughput is an average throughput of traffic sent to or received by a plurality of user devices, via the WLAN over the same particular period of time.

12. The server device of claim 9, wherein the cellular wireless network operates at a set of frequency bands that have been licensed from a governmental entity, and
 wherein the WLAN operates at a set of frequency bands that have not been licensed from a governmental entity.

13. The server device of claim 9, wherein executing the set of processor-executable instructions to select the particular one of the cellular wireless network and the WLAN, based on the comparing, further causes the one or more processors to:
 determine whether the first measure of throughput is greater than the second measure of throughput;
 select, when determining that the first measure of throughput is greater than the second measure of throughput, the cellular wireless network; and
 select, when determining that the first measure of throughput is not greater than the second measure of throughput, the WLAN.

14. The server device of claim 9, wherein executing the set of processor-executable instructions to select the particular one of the cellular wireless network and the WLAN, based on the comparing, further causes the one or more processors to:
 determine whether the first measure of throughput is greater than the second measure of throughput by at least a threshold amount;
 select, when determining that the first measure of throughput is greater than the second measure of throughput by at least the threshold amount, the cellular wireless network; and
 select, when determining that the first measure of throughput is not greater than the second measure of throughput by at least the threshold amount, the WLAN.

15. The server device of claim 9, wherein the cellular wireless network is the selected particular one of the cellular wireless network and the WLAN,
 wherein the instruction, sent to the user device, further instructs the user device to disable wireless circuitry, of the user device, that allows the user device to connect to the WLAN.

16. A method, comprising:
 determining, by a user device, a first measure of throughput associated with a cellular wireless network that is in range of the user device;
 determining, by the user device, a second measure of throughput associated with a wireless local area network ("WLAN") that is in range of the user device;
 comparing, by the user device, the first measure of throughput to the second measure of throughput;
 selecting, by the user device and based on the comparing, a particular one of the cellular wireless network and the WLAN; and
 connecting, by the user device, to the selected particular one of the cellular wireless network or the WLAN.

17. The method of claim 16, wherein determining the first measure of throughput includes receiving information regarding the first measure of throughput from a server device that determines throughput associated with the cellular wireless network.

18. The method of claim 17, wherein the first measure of throughput is based on measured throughput of traffic sent or received by a plurality of user devices via the cellular wireless network.

19. The method of claim 16, wherein determining the second measure of throughput includes:
 connecting to the WLAN; and
 performing a throughput test via the WLAN.

20. The method of claim 16, wherein selecting the particular one of the cellular wireless network and the WLAN, based on the comparing, includes:
 determining whether the first measure of throughput is greater than the second measure of throughput by at least a threshold amount;

selecting, when determining that the first measure of throughput is greater than the second measure of throughput by at least the threshold amount, the cellular wireless network; and selecting, when determining that the first measure of throughput is not greater than the second measure of throughput by at least the threshold amount, the WLAN.

* * * * *